US012708078B1

(12) United States Patent
Wu

(10) Patent No.: US 12,708,078 B1
(45) Date of Patent: Aug. 18, 2026

(54) SUNLIGHT-ADAPTIVE INTELLIGENT IRRIGATION SYSTEM BASED ON SOLAR CHARGING POWER DETECTION AND METHOD THEREOF

(71) Applicant: Shan Wu, Guangdong (CN)

(72) Inventor: Shan Wu, Guangdong (CN)

( * ) Notice: Subject to any disclaimer, the term of this patent is extended or adjusted under 35 U.S.C. 154(b) by 0 days.

(21) Appl. No.: 19/343,041

(22) Filed: Sep. 29, 2025

(51) Int. Cl.
*G05B 13/02* (2006.01)
*A01G 25/16* (2006.01)

(52) U.S. Cl.
CPC ....... *A01G 25/167* (2013.01); *G05B 13/0265* (2013.01)

(58) Field of Classification Search
None
See application file for complete search history.

(56) References Cited

U.S. PATENT DOCUMENTS 8,606,415 B1 * 12/2013 Woytowitz ............. A01G 25/16 455/39
9,301,461 B2 * 4/2016 Woytowitz ............. A01G 25/16
10,918,030 B2 * 2/2021 Woytowitz ........... A01G 25/162
11,116,154 B2 * 9/2021 Shakoor ................. H04N 23/54
11,921,479 B2 * 3/2024 Valin ....................... H02S 10/10
11,980,142 B2 * 5/2024 Renaux ................ A01G 25/165
D1,070,737 S * 4/2025 Wu ............................. D13/102
2014/0088771 A1 * 3/2014 Woytowitz ........... A01G 25/167 700/284
2014/0172180 A1 * 6/2014 Woytowitz ............. A01G 25/16 700/284
2014/0265897 A1 * 9/2014 Taipale .................. H05B 47/10 363/126
2020/0015438 A1 * 1/2020 Klicpera .............. A01G 25/165
2020/0163293 A1 * 5/2020 Charling .............. G05B 13/028
2020/0359580 A1 * 11/2020 Montgomery .......... H04W 4/80
2020/0383284 A1 * 12/2020 Larsen .................... G01W 1/14
(Continued)

FOREIGN PATENT DOCUMENTS

CA 3155159 A1 * 6/2022 ........... A01G 25/165
CN 202958363 U * 6/2013 ............ B05B 12/12
(Continued)

OTHER PUBLICATIONS

Li et al., "An integrated solar-driven system produces electricity with fresh water and crops in arid regions", Mar. 2022, Cell Reports Physical Science 3, 100781. (Year: 2022).*
(Continued)

*Primary Examiner* — Mohammad Ali
*Assistant Examiner* — Kelvin Booker
(74) *Attorney, Agent, or Firm* — Hawaii Patent Services; Nathaniel K. Fedde; Kenton N. Fedde

(57) ABSTRACT

The present disclosure relates to a sunlight-adaptive intelligent irrigation system based on solar charging power detection and a method thereof. This system comprises a main control unit, a parameter setting module, a solar detection module and a drive execution module. By utilizes solar panels to detect electrical parameters to indirectly sense light intensity, the main control unit adaptively adjusts the irrigation amount accordingly. This addresses the issue of conventional timed irrigators being unable to adjust water volume based on sunlight conditions, thereby achieving water conservation and efficient irrigation.

16 Claims, 11 Drawing Sheets

(56) References Cited

U.S. PATENT DOCUMENTS

| | | | | |
|---|---|---|---|---|
| 2021/0127605 | A1* | 5/2021 | Aughton | A01G 25/167 |
| 2021/0137035 | A1* | 5/2021 | Huang | A01G 25/165 |
| 2021/0294287 | A1* | 9/2021 | Valin | H02K 9/19 |
| 2023/0301252 | A1* | 9/2023 | Yang | G06V 20/188 |
| 2023/0320294 | A1* | 10/2023 | Renaux | H04W 4/38 |
| 2023/0337606 | A1* | 10/2023 | Borhani | A01G 27/003 |
| 2024/0218951 | A1* | 7/2024 | Schenk | F16L 37/44 |
| 2026/0013449 | A1* | 1/2026 | Sheline | A01G 25/165 |

FOREIGN PATENT DOCUMENTS

| | | | | | |
|---|---|---|---|---|---|
| CN | 207269529 | U | * | 4/2018 | A01G 25/16 |
| CN | 207543940 | U | * | 6/2018 | G06Q 50/26 |
| CN | 109220717 | A | * | 1/2019 | A01G 25/02 |
| CN | 112293205 | A | * | 2/2021 | A01G 25/16 |
| CN | 213306630 | U | * | 6/2021 | B05B 12/12 |
| CN | 219083413 | U | * | 5/2023 | A01G 25/16 |
| CN | 119477585 | B | * | 11/2025 | G06Q 50/26 |
| CN | 120477038 | B | * | 2/2026 | A01G 25/16 |
| DE | 102017114740 | A1 | * | 1/2019 | B05B 12/12 |
| GB | 2613633 | A | * | 6/2023 | A01G 9/246 |

OTHER PUBLICATIONS

Garcia et al., "Coupling irrigation scheduling with solar energy production in a smart irrigation management system", Dec. 2017, Journal of Cleaner Production 175 (2018). (Year: 2017).*

Hassan et al., "Smart irrigation system with photovoltaic supply", Aug. 2021, Bulletin of Electrical Engineering and Informatics vol. 11, No. 1, Feb. 2022, pp. 29~41. (Year: 2021).*

Wanyama et al., "Development of a solar powered smart irrigation control system Kit", Jul. 2022, Smart Agricultural Technology 5 (2023) 100273. (Year: 2022).*

Ismail et al., "Maximizing energy via solar-powered smart irrigation: An approach utilizing a single-axis solar tracking mechanism", Aug. 2023, Irrig. and Drain. 2024;1-17. (Year: 2023).*

* cited by examiner

Setting basic irrigation parameters of the system, wherein the basic irrigation parameters comprise an irrigation interval and a standard single irrigation duration based on standard sunlight conditions Periodically detecting electrical parameter of the solar panel and calculating sunlight intensity decision value data of a current environment based on the electrical parameter Comparing the sunlight intensity decision value data with preset sunlight intensity ranges and generating corresponding sunlight intensity grade data Proportionally adjusting and processing the standard single irrigation duration based on the sunlight intensity grade data to calculate and generate the corresponding actual irrigation duration When an irrigation time determined by the irrigation interval arrives, controlling an execution component to operate for the actual irrigation duration and perform irrigation in real time

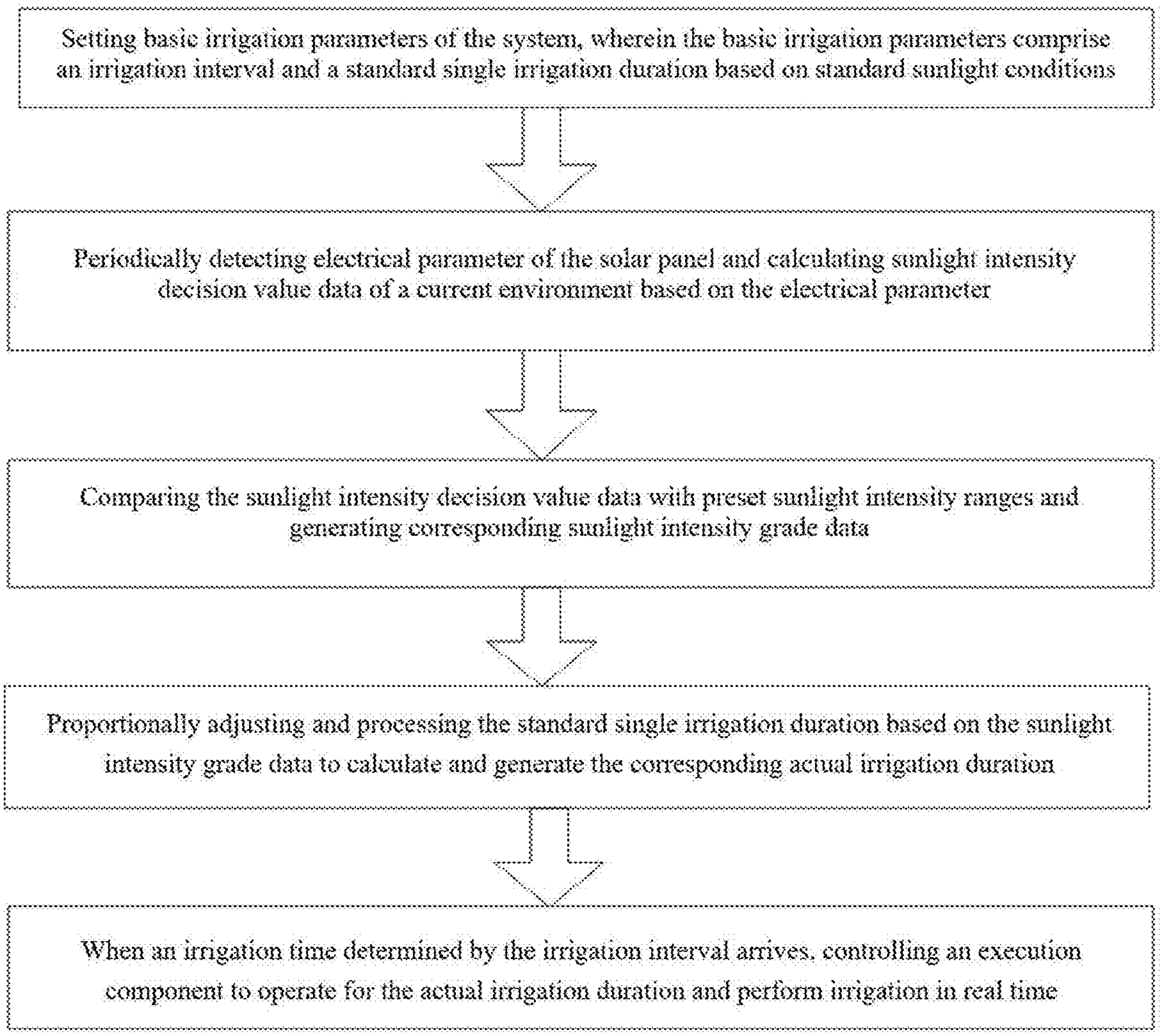

FIG. 13

SUNLIGHT-ADAPTIVE INTELLIGENT IRRIGATION SYSTEM BASED ON SOLAR CHARGING POWER DETECTION AND METHOD THEREOF

TECHNICAL FIELD

The present disclosure relates to the field of automatic irrigation technology, particularly to a sunlight-adaptive intelligent irrigation system based on solar charging power detection and a method thereof.

BACKGROUND

The essence of an automatic irrigator (or watering timer) is a timing controller, whose core function is to set the irrigation interval (how often) and the single irrigation duration (how long), thereby controlling the total irrigation volume. Existing automatic irrigators on the market have mainly gone through the following development stages:

First stage: Mechanical knobs or buttons are used to select limited settings, with each setting corresponding to fixed irrigation intervals and durations. This method lacks fine-tuning capability and flexibility.

Second stage: Buttons or knobs combined with screen displays allow for more parameter settings, with some products enabling users to set specific irrigation times instead of intervals. User experience is improved, but intelligence remains limited.

Third stage: Settings through a mobile app enable remote control and simple smart integration (e.g., pausing during rain). However, the irrigation volume remains fixed and cannot adjust based on real-time weather conditions.

The aforementioned existing technologies share a common drawback: once set, the irrigation amount becomes a fixed value and cannot be automatically adjusted based on environmental factors such as actual sunlight intensity. In practice, this leads to insufficient watering under strong sunlight and high evaporation conditions, affecting plant growth, while excessive watering occurs during cloudy or low-light weather, resulting in water waste.

Therefore, to address the above technical shortcomings, there is an urgent need to design and develop a sunlight-adaptive intelligent irrigation system and method based on solar charging power detection.

SUMMARY

An object of the present disclosure is to solve the problem of existing automatic irrigators being unable to adjust irrigation amounts based on environmental sunlight intensity, providing a low-cost, highly reliable intelligent irrigation solution that achieves the optimized irrigation goal of "more watering under strong sunlight and less watering under weak sunlight."

The object of the present disclosure is realized as follows: the system comprises at least one main control unit for issuing intelligent irrigation control commands;

a parameter setting module electrically connected to the main control unit for setting and inputting basic irrigation parameters; a solar detection module for detecting an electrical parameter of a solar panel and transmitting detection signals to the main control unit; and a drive execution module for controlling opening and closing of a water pump or a water valve according to the commands from the main control unit.

Further, the main control unit is configured to receive and store the basic irrigation parameters; receive the detection signals from the solar detection module and calculate a sunlight intensity decision value and a sunlight intensity grade; compute an actual irrigation duration based on the sunlight intensity grade and a standard single irrigation duration;

and send the control commands to the drive execution module according to an irrigation interval and the actual irrigation duration.

Further, the solar detection module comprises a power supply management module that is respectively connected to the solar panel, a rechargeable battery, and various power consumption modules within the system and is configured to manage solar charging and battery charge/discharge protection and provide a stable operating voltage for the system.

Further, the power supply management module is provided with a first control circuit for controlling solar charging and battery charge/discharge protection and providing a stable operating voltage for the system;

the first control circuit is provided with a sixth MOS transistor; a drain of the sixth MOS transistor is connected to a thirty-first resistor, a second resistor, a first resistor and a solar panel input terminal respectively; and a gate of the sixth MOS transistor is connected to a collector of a seventh triode; a source of the sixth MOS transistor is connected to one end of a first capacitor and an anode of a first diode respectively.

Further, the system further comprises a state monitoring module electrically connected to the main control unit and configured to monitor a real-time operating state of the system;

the state monitoring module comprises one or more of the following sub-modules:

a water pump current detection sub-module for detecting an operating current of the water pump to determine an idle, normal, or stall states of the water pump;

a water level detection sub-module for detecting a water source level to determine a water shortage state; and a battery voltage detection sub-module for detecting a rechargeable battery voltage to determine a battery level state.

Further, the system further comprises a human-machine interaction module electrically connected to the main control unit;

the human-machine interaction module comprises one or more of the following units:

a display unit for displaying the basic irrigation parameters, the sunlight intensity grade, the actual irrigation duration, and the real-time operating state of the system;

an alarm unit for issuing an audio-visual alarm when the state monitoring module detects an abnormal state; and a key input unit for receiving operation inputs from a user.

Further, the system further comprises a second control circuit for coordinatively issuing the intelligent irrigation control commands, wherein the second control circuit is a single-chip microcomputer control circuit.

Further, the second control circuit is provided with a fourth control chip;

a twenty-first pin of the fourth control chip is connected to one end of a first crystal oscillator and one end of a twelfth capacitor respectively;

a twenty-second pin of the fourth control chip is connected to the other end of the first crystal oscillator and one end of the eleventh capacitor respectively; a fourteenth pin of the fourth control chip is connected to one end of a fourteenth capacitor and a power terminal respectively; and the other end of the twelfth capacitor, the other end of the fourteenth capacitor and the other end of the eleventh capacitor are all grounded.

Further, a model of the fourth control chip is XY51F154.

Further, the system further comprises a third control circuit that cooperates with the main control unit to determine a sunlight intensity value by detecting a charging voltage or an average current of the solar panel, thereby determining the irrigation duration, wherein the third control circuit is a solar sunlight intensity detection circuit.

Further, the third control circuit is provided with an eighth MOS transistor;

a drain of the eighth MOS transistor is connected to one end of a thirty-fifth resistor and one end of a thirty-sixth resistor respectively; the other ends of the thirty-fifth resistor and the thirty-sixth resistor are both connected to a voltage terminal;

a gate of the eighth MOS transistor is connected to one end of a thirty-seventh resistor and one end of a thirty-eighth resistor respectively; the other end of the thirty-seventh resistor is electrically connected to the second control circuit;

a source of the eighth MOS transistor is connected to one end of a thirty-ninth resistor, one end of a fortieth resistor and one end of a forty-first resistor respectively;

the other end of the thirty-ninth resistor is electrically connected to one end of a fifteenth capacitor and the second control circuit respectively;

the other ends of the thirty-eighth resistor, the fortieth resistor, the forty-first resistor and the fifteenth capacitor are all grounded.

Further, a model of the eighth MOS transistor is A03400.

To achieve the above object, the present disclosure further provides a sunlight-adaptive intelligent irrigation method based on solar charging power detection, wherein the method is applied to the sunlight-adaptive intelligent irrigation system based on solar charging power detection; the method comprises the following steps of:

setting basic irrigation parameters of the system, wherein the basic irrigation parameters comprise an irrigation interval and a standard single irrigation duration based on standard sunlight conditions;

periodically detecting electrical parameter of the solar panel and calculating sunlight intensity decision value data of a current environment based on the electrical parameter;

comparing the sunlight intensity decision value data with preset sunlight intensity ranges and generating corresponding sunlight intensity grade data;

proportionally adjusting and processing the standard single irrigation duration based on the sunlight intensity grade data to calculate and generate the corresponding actual irrigation duration; and when an irrigation time determined by the irrigation interval arrives, controlling an execution component to operate for the actual irrigation duration and perform irrigation in real time.

Further, the electrical parameter is one of charging voltage, charging current or charging power of the solar panel.

Further, the step of periodically detecting involves: collecting instantaneous electrical parameters of the solar panel at a first predefined time interval, averaging multiple collected instantaneous values within a second predefined time window, and using a resulting average as the sunlight intensity decision value.

To achieve the above object, the present disclosure further provides an automatic irrigator, comprising a housing, a control circuit housed within the housing, and a water pump or a water valve connected to the control circuit, wherein the control circuit comprises the sunlight-adaptive intelligent irrigation system based on solar charging power detection.

To achieve the above object, the present disclosure further provides a computer-readable storage medium storing a computer program, wherein the program, when executed by a processor, implements the sunlight-adaptive intelligent irrigation method based on solar charging power detection.

With the aid of the system of the present disclosure, which includes at least one main control unit for issuing intelligent irrigation control commands, a parameter setting module electrically connected to the main control unit for setting and inputting basic irrigation parameters, a solar detection module for detecting an electrical parameter of a solar panel and transmitting detection signals to the main control unit, and a drive execution module for controlling opening and closing of a water pump or a water valve according to the commands from the main control unit, by utilizing the solar panel itself as a light sensor and indirectly detecting environmental sunlight intensity through its output electrical parameter at low cost, the system achieves intelligent adaptive adjustment of irrigation volume based on weather changes. This solves the problem of existing timed irrigation systems being unable to automatically adjust water volume according to sunlight conditions, achieving water conservation and efficient irrigation.

In other words, the present disclosure uses the inherent output voltage of the system's solar panel as the detection target. Through voltage division sampling and averaging, it intelligently senses environmental sunlight intensity and automatically adjusts the single irrigation duration proportionally. This significantly enhances the environmental adaptability and water-saving efficiency of the irrigation system without the need for additional dedicated light sensors, while ensuring system reliability and cost-effectiveness.

BRIEF DESCRIPTION OF DRAWINGS

To more clearly illustrate the technical solutions in the embodiments of the present disclosure, the following briefly introduces the accompanying drawings required for describing the embodiments. Obviously, the drawings in the following description are merely some embodiments of the present disclosure. For those of ordinary skill in the art, other drawings can be derived from these illustrations without creative effort.

FIG. 13 is a schematic diagram of the process steps of the sunlight-adaptive intelligent irrigation method based on solar charging power detection according to the present disclosure;

Figure 1:
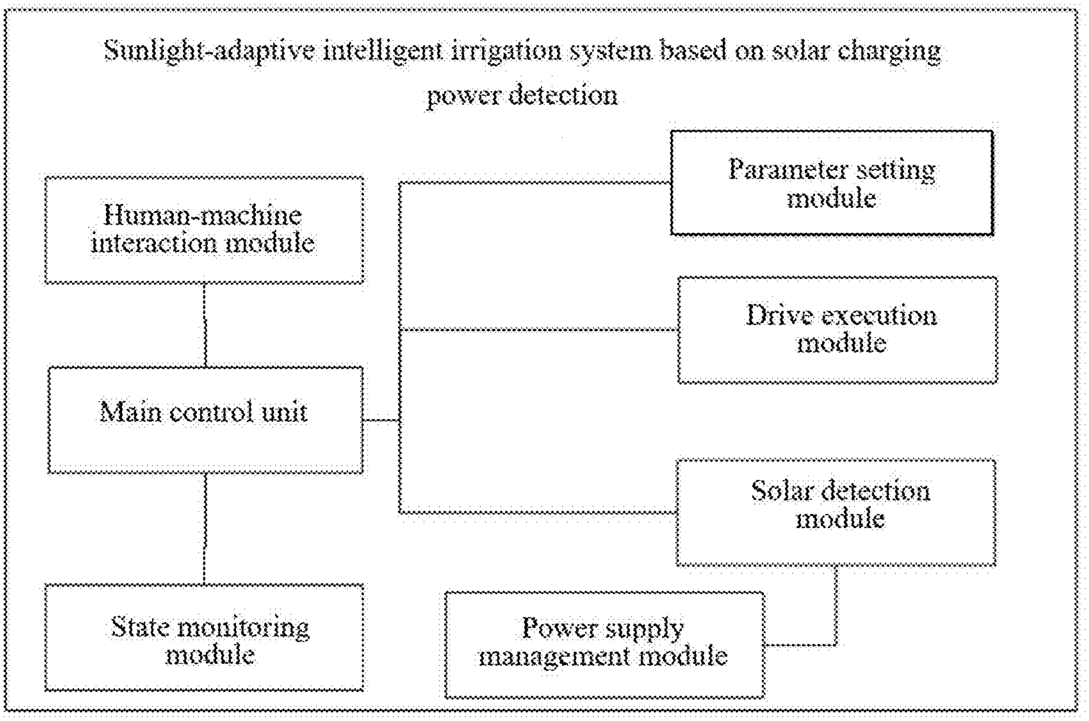
FIG. 1 is a schematic diagram of the framework of a sunlight-adaptive intelligent irrigation system based on solar charging power detection according to the present disclosure.

Reference signs: Q6—Sixth MOS transistor; Q7—Seventh triode; R31—Thirty-first resistor; R2—Second resistor; R1—First resistor; R35—Thirty-fifth resistor; R36—Thirty-sixth resistor; R37—Thirty-seventh resistor; R38—Thirty-eighth resistor; R39—Thirty-ninth resistor; R40—Fortieth resistor; R41—Forty—first resistor; C1—First capacitor; C15—Fifteenth capacitor; D1—First diode; U4—Fourth control chip; Y1—First crystal oscillator; C11—Eleventh capacitor; C12—Twelfth capacitor.

DESCRIPTION OF EMBODIMENTS

Unless

To better understand the objectives, technical solutions, and advantages of the present disclosure, the following further elaborates on the present disclosure with reference to the accompanying drawings and specific implementations. Other benefits and effects of the present disclosure can be easily understood by those skilled in the art from the contents disclosed in this specification.

The present disclosure can also be implemented or applied through other different specific examples. Various details in this specification can be modified or changed based on different perspectives and applications without departing from the spirit of the present disclosure.

It should be noted that if directional indications (such as up, down, left, right, front, back, etc.) are involved in the embodiments of the present disclosure, these directional indications are only used to explain the relative positional relationships, movements, etc., between components in a specific posture (as shown in the drawings). If this specific posture changes, the directional indications will also change accordingly.

Additionally, if the embodiments of the present disclosure involve descriptions such as "first," "second," etc., these terms are used solely for descriptive purposes and should not be construed as indicating or implying relative importance or implicitly specifying the quantity of the indicated technical features. Thus, features defined as "first," "second," etc., may explicitly or implicitly include at least one such feature. Furthermore, technical solutions from various embodiments may be combined, provided such combination is achievable by one of ordinary skill in the art. If the combination of technical solutions results in contradictions or is unfeasible, such a combination should be deemed non-existent and outside the scope of protection claimed by the present disclosure.

The following further elaborates on the present disclosure with reference to the accompanying drawings.

As shown in FIGS. 1-12, the present disclosure provides a sunlight-adaptive intelligent irrigation system based on solar charging power detection. The system includes at least one main control unit for issuing intelligent irrigation control commands;

a parameter setting module electrically connected to the main control unit for setting and inputting basic irrigation parameters; a solar detection module for detecting an electrical parameter of a solar panel and transmitting detection signals to the main control unit; and a drive execution module for controlling opening and closing of a water pump or a water valve according to the commands from the main control unit.

The main control unit is used to receive and store the basic irrigation parameters; receive the detection signals from the solar detection module and calculate a sunlight intensity decision value and a sunlight intensity grade; compute an actual irrigation duration based on the sunlight intensity grade and a standard single irrigation duration;

and send the control commands to the drive execution module according to an irrigation interval and the actual irrigation duration.

The solar detection module comprises a power supply management module that is respectively connected to the solar panel, a rechargeable battery, and various power consumption modules within the system and is used to manage solar charging and battery charge/discharge protection and provide a stable operating voltage for the system.

The power supply management module is provided with a first control circuit for controlling solar charging and battery charge/discharge protection and providing a stable operating voltage for the system;

the first control circuit is provided with a sixth MOS transistor; the drain of the sixth MOS transistor is connected to a thirty-first resistor, a second resistor, a first resistor and a solar panel input terminal respectively; and the gate of the sixth MOS transistor is connected to a collector of a seventh triode; a source of the sixth MOS transistor is connected to one end of a first capacitor and the anode of a first diode respectively.

Figure 2:
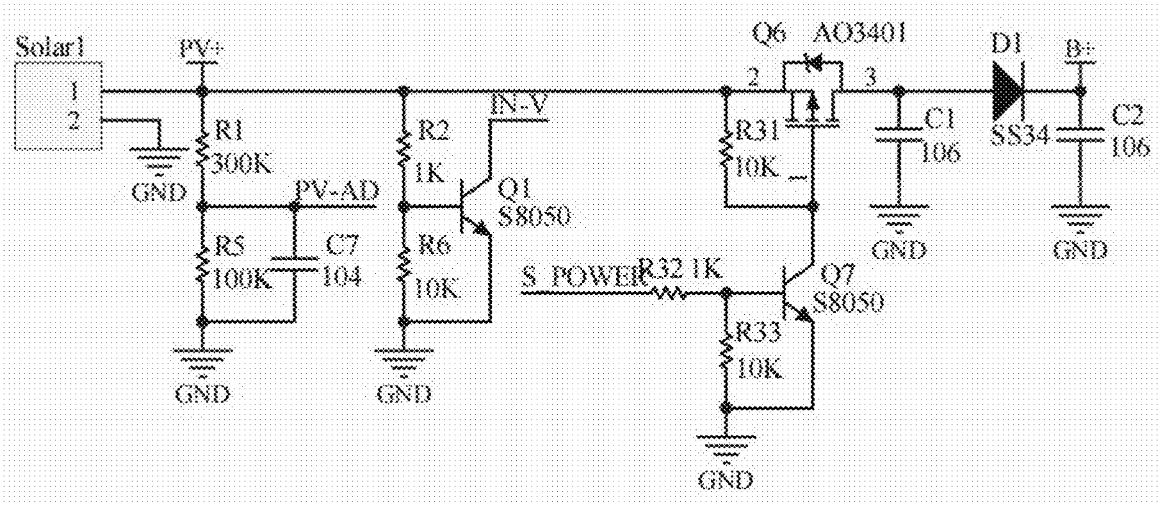
FIG. 2 is a schematic diagram of a solar charging management circuit in the sunlight-adaptive intelligent irrigation system based on solar charging power detection according to the present disclosure.

Specifically, in the embodiment of the present disclosure, as shown in FIG. 2; Solar1 is the solar panel input interface, which detects its AD value through R1 and R5 voltage division and analyzes it through the single-chip microcomputer U4 (PV-AD). A voltage level detection circuit is formed by R2, R6 and Q1. When the solar panel voltage changes, Q1 turns on or off U4 (IN-V) to determine whether the device is in daytime or nighttime state. The solar charging management circuit is composed of R32, R33, Q7, R31 and Q6, and the corresponding algorithm of U4 (S-POWER) is used to turn Q6 on or off, thereby achieving control over the solar panel charging management. Here, U4 (S-POWER) determines whether charging is nearing full capacity according to the detection feedback of the battery voltage level signal through U4, thus deciding to turn Q6 on or off. (For example: when the battery voltage charges to around 4.1V, U4 (S-POWER) adjusts PWM to reduce the charging current; charging is turned off when the voltage reaches around 4.2V; during device usage, when the voltage drops to around 4.0V, U4 (S-POWER) turns on again to resume charging. This process achieves the goal of controlling solar panel charging management.)

The system is also equipped with a state monitoring module electrically connected to the main control unit for monitoring the real-time operating state of the system.

The state monitoring module includes one or more of the following sub-modules:

a water pump current detection sub-module for detecting an operating current of the water pump to determine an idle, normal, or stall states of the water pump;

a water level detection sub-module for detecting a water source level to determine a water shortage state; and a battery voltage detection sub-module for detecting a rechargeable battery voltage to determine a battery level state.

Further, the system further includes a human-machine interaction module electrically connected to the main control unit;

the human-machine interaction module comprises one or more of the following units:

a display unit for displaying the basic irrigation parameters, the sunlight intensity grade, the actual irrigation duration, and the real-time operating state of the system;

an alarm unit for issuing an audio-visual alarm when the state monitoring module detects an abnormal state; and a key input unit for receiving operation inputs from a user.

The system further comprises a second control circuit for coordinatively issuing the intelligent irrigation control commands, wherein the second control circuit is a single-chip microcomputer control circuit.

The second control circuit is provided with a fourth control chip;

a twenty-first pin of the fourth control chip is connected to one end of a first crystal oscillator and one end of a twelfth capacitor respectively;

a twenty-second pin of the fourth control chip is connected to the other end of the first crystal oscillator and one end of the eleventh capacitor respectively; a fourteenth pin of the fourth control chip is connected to one end of a fourteenth capacitor and a power terminal respectively; and the other end of the twelfth capacitor, the other end of the fourteenth capacitor and the other end of the eleventh capacitor are all grounded.

The model of the fourth control chip is XY51F154.

Figure 3:
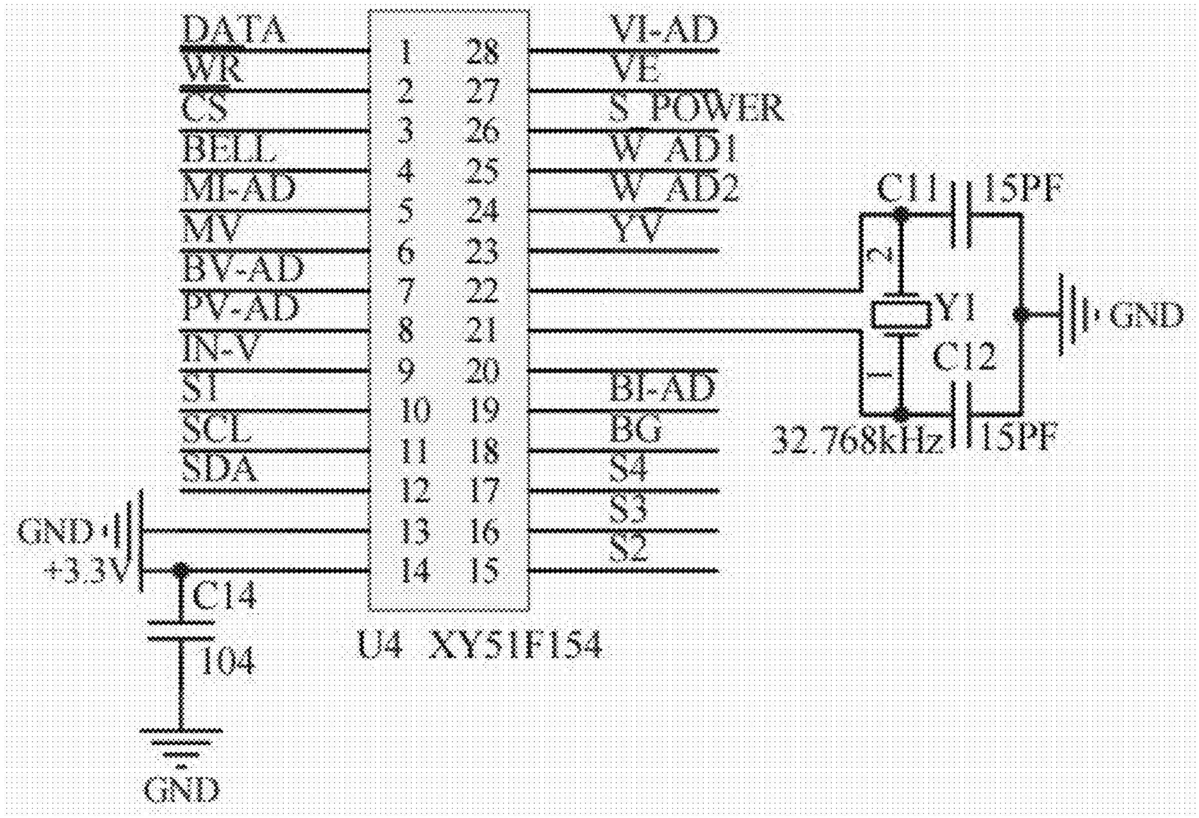
FIG. 3 is a schematic diagram of a single-chip microcomputer control circuit in the sunlight-adaptive intelligent irrigation system based on solar charging power detection according to the present disclosure.

Specifically, in an embodiment of the present disclosure, as shown in FIG. 3, it is a single-chip microcomputer control circuit. C11, Y1 and C12 form the crystal oscillator circuit, providing a stable clock signal for the single-chip microcomputer U4 to synchronize the operation of various components. Meanwhile, the control pins of U4, combined with the corresponding program, serve as the control source for realizing the functions of this product.

The system further includes a third control circuit that cooperates with the main control unit to determine a sunlight intensity value by detecting a charging voltage or an average current of the solar panel, thereby determining the irrigation duration, wherein the third control circuit is a solar sunlight intensity detection circuit.

The third control circuit is provided with an eighth MOS transistor;

a drain of the eighth MOS transistor is connected to one end of a thirty-fifth resistor and one end of a thirty-sixth resistor respectively; the other ends of the thirty-fifth resistor and the thirty-sixth resistor are both connected to a voltage terminal;

a gate of the eighth MOS transistor is connected to one end of a thirty-seventh resistor and one end of a thirty-eighth resistor respectively; the other end of the thirty-seventh resistor is electrically connected to the second control circuit;

a source of the eighth MOS transistor is connected to one end of a thirty-ninth resistor, one end of a fortieth resistor and one end of a forty-first resistor respectively;

the other end of the thirty-ninth resistor is electrically connected to one end of a fifteenth capacitor and the second control circuit respectively;

the other ends of the thirty-eighth resistor, the fortieth resistor, the forty-first resistor and the fifteenth capacitor are all grounded.

The model of the eighth MOS transistor is A03400.

Figure 4:
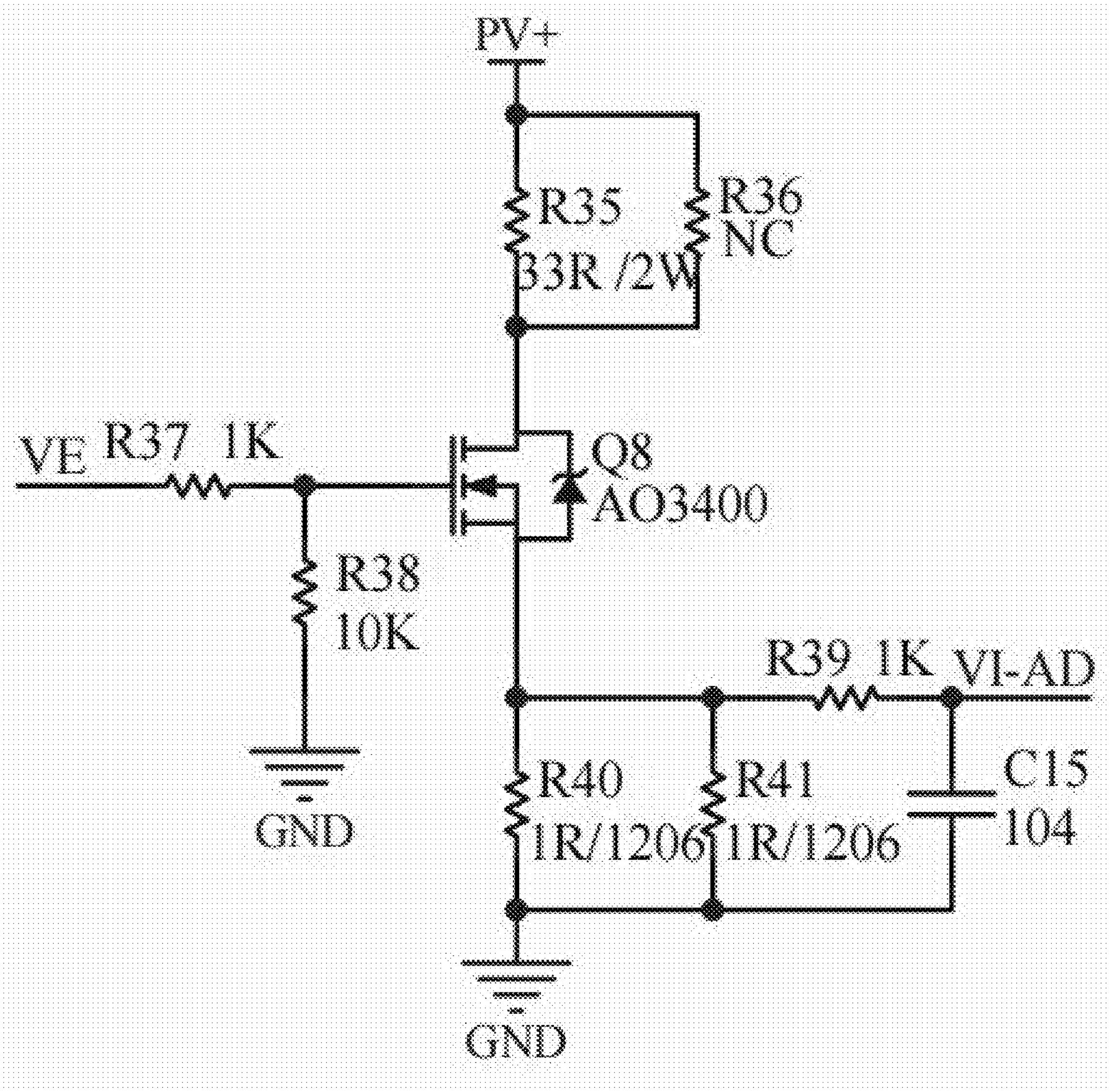
FIG. 4 is a schematic diagram of a solar sunlight intensity detection circuit in the sunlight-adaptive intelligent irrigation system based on solar charging power detection according to the present disclosure.

Specifically, in the embodiment of the present disclosure, as shown in FIG. 4, it is the solar sunlight intensity detection circuit. Composed of R37, R38, Q8, R40, R41, R39, C15 and R35, this circuit controls the on/off state of Q8 through U4 (VE). The solar panel voltage PV+ is conducted or cut off to ground through R35, generating different sampling signals under varying sunlight intensities to determine the strength of sunlight. The detection frequency is once every 6-10 seconds, with an average calculated every two hours. U4 controls the irrigation duration of the water pump MOT01 (with the corresponding irrigation program prewritten in U4) and displays different sunlight intensity values and irrigation durations on the LCD. The technical solution of this application can determine the sunlight intensity value by detecting the average charging voltage or current of the solar panel, thereby determining the irrigation duration.

Figure 5:
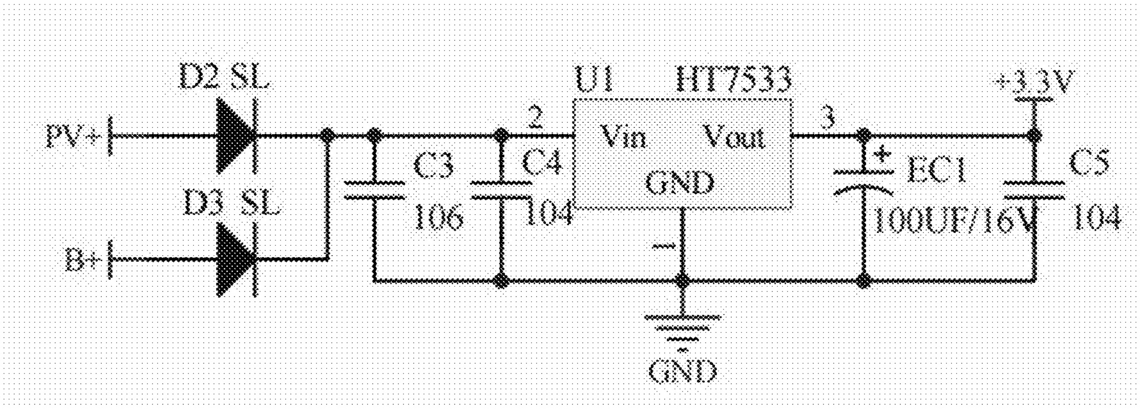
FIG. 5 is a schematic diagram of a 3.3V output circuit in the sunlight-adaptive intelligent irrigation system based on solar charging power detection according to the present disclosure.

Based on the above embodiment, in the present disclosure, a 3.3V output circuit is also included, as shown in FIG. 5. This circuit can be powered by both the solar panel PV+ and the battery B+, generating a 3.3V voltage through U1, C3, C4, EC1C5 to provide a standard power supply voltage for circuits such as U4 and U5.

Figure 6:
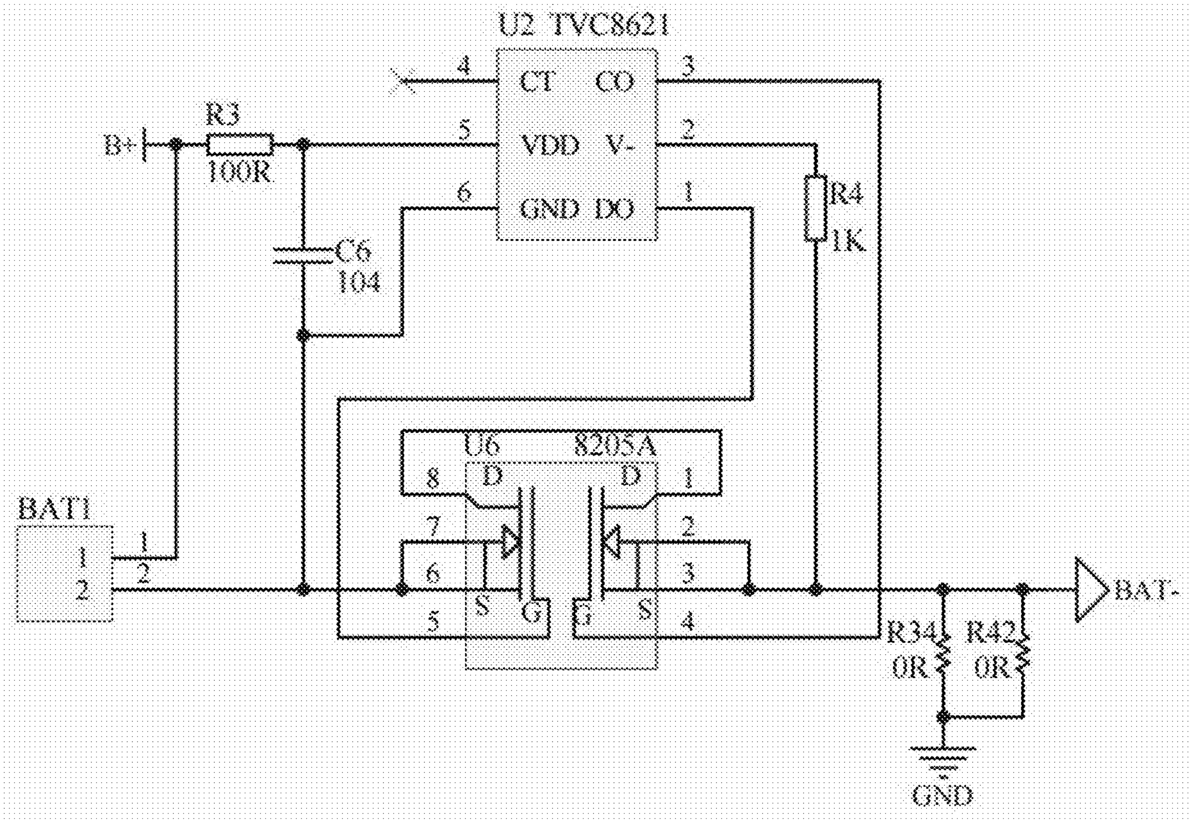
FIG. 6 is a schematic diagram of a battery charge-discharge management circuit in the sunlight-adaptive intelligent irrigation system based on solar charging power detection according to the present disclosure.

Based on the above embodiment, in the embodiment of the present disclosure, the solution also includes a battery charge-discharge management circuit, as shown in FIG. 6. BAT1 serves as the battery interface, and a battery charging and discharging management circuit is composed of R3, C6, R4, U2 and R6. The internal chip function cuts off discharge when the battery reaches 3.0V and stops charging at 4.25V, achieving protection against over-discharge and over-charge.

Figure 7:
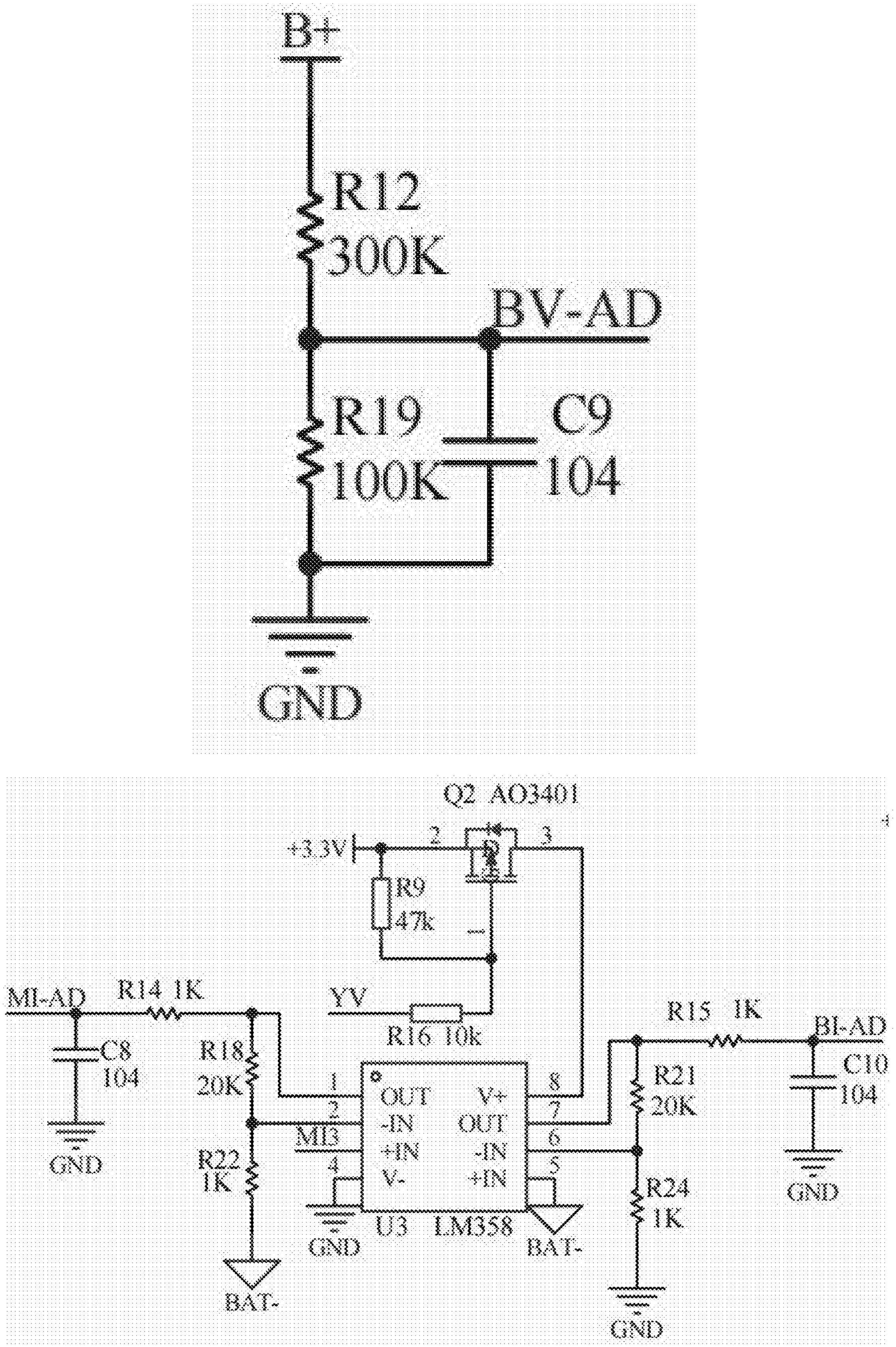
FIG. 7 is a schematic diagram of a battery voltage detection circuit and a charging current detection circuit in the sunlight-adaptive intelligent irrigation system based on solar charging power detection according to the present disclosure.

Based on the above embodiment, in the embodiment of the present disclosure, the solution also includes a battery voltage detection circuit and a charging current detection circuit, as shown in FIG. 7. The battery voltage B+ is detected through voltage division through R12 and R19, with the detection level signal processed by U4 (BV-AD) to determine low power and full charge, displayed on the LCD. Simultaneously, the charging current detection circuit, composed of U3, R15, R21, and R24, works with the battery voltage detection circuit to provide feedback on post-charge current, protecting the battery from damage due to sustained high-current charging.

Figure 8:
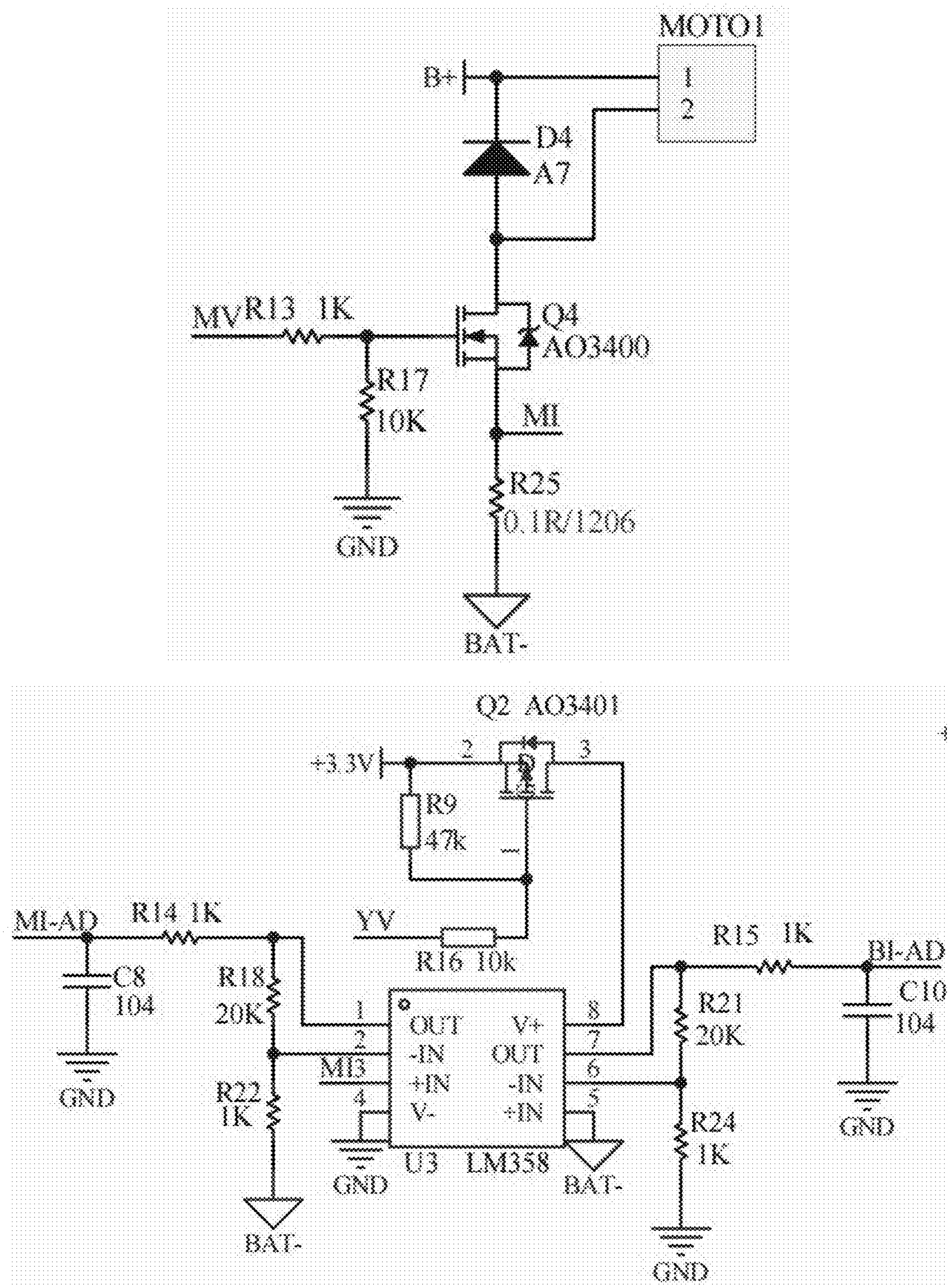
FIG. 8 is a schematic diagram of a water pump control circuit and a water pump operating current detection circuit of the sunlight-adaptive intelligent irrigation system based on solar charging power detection according to the present disclosure.

Based on the above embodiment, in the embodiment of the present disclosure, the solution also includes a water pump control circuit and a water pump operating current detection circuit, as shown in FIG. 8. The control circuit, formed by R13, R17, Q4 and D4, uses U4 (MV) to switch Q4 on or off, thereby opening or closing the water pump MOTO1. The R25 U3 detection circuit monitors the operating current of the water pump MOTO1, using this detection signal to determine if the pump is idle, operating, or in a stall state, with the state displayed on the LCD.

Figure 9:
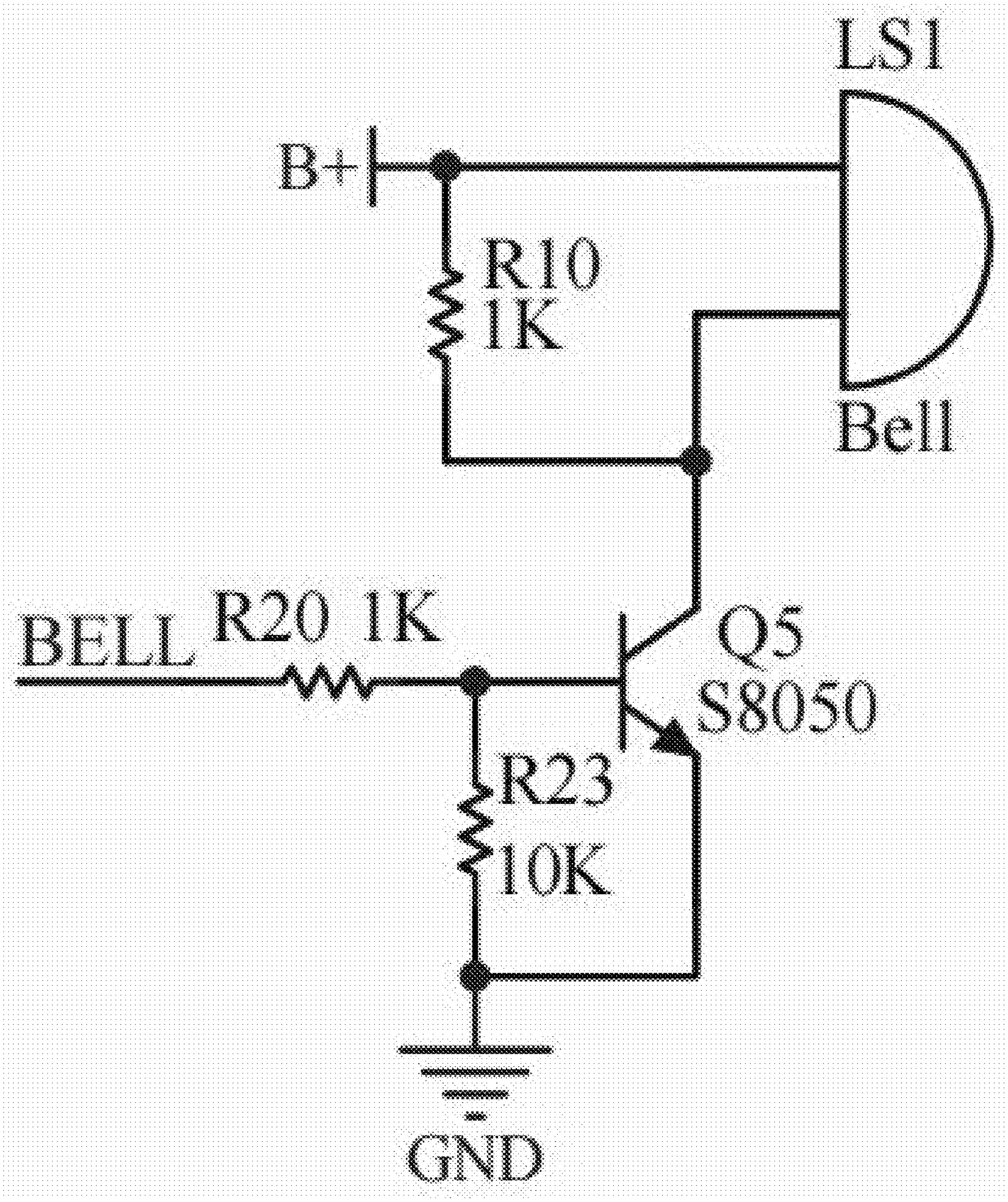
FIG. 9 is a schematic diagram of a buzzer control circuit of the sunlight-adaptive intelligent irrigation system based on solar charging power detection according to the present disclosure.

Based on the above embodiment, in the embodiment of the present disclosure, the solution also includes a buzzer control circuit, as shown in FIG. 9. Composed of R20, R10, R23, Q5, LS1 and U4 (BELL), this circuit controls the buzzer's activation or deactivation. When activated, the buzzer sounds; when deactivated, it remains silent, providing alerts for circuit anomalies (e.g., water pump idle, water pump stall, or low water level alarms).

Figure 10:
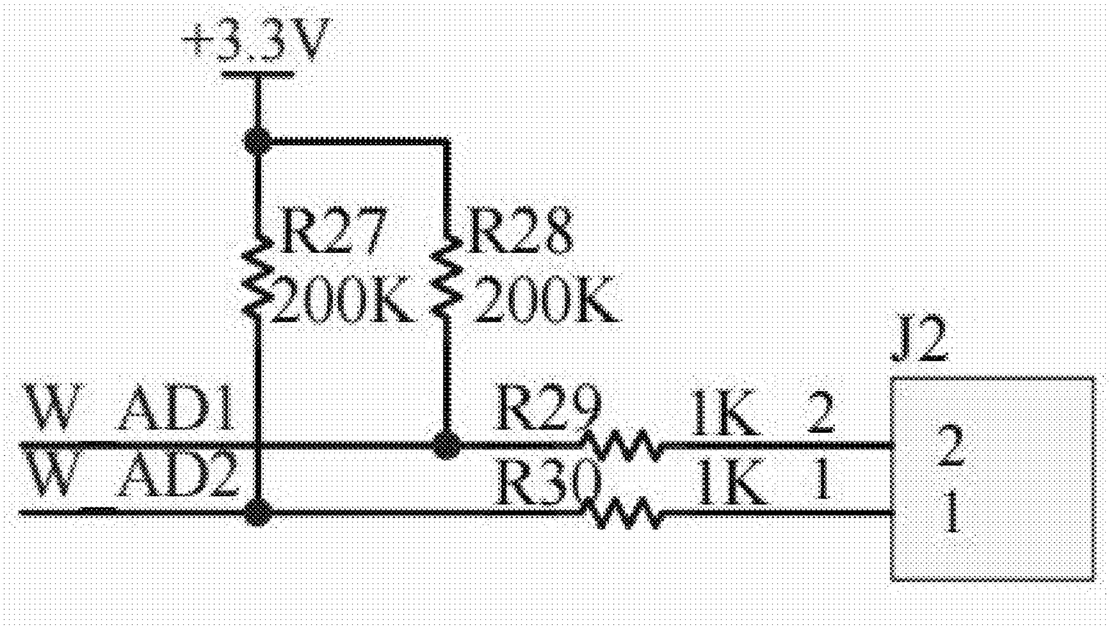
FIG. 10 is a schematic diagram of the water level detection circuit of the sunlight-adaptive intelligent irrigation system based on solar charging power detection according to the present disclosure.

Based on the above embodiment, in the embodiment of the present disclosure, the solution also includes a water level detection circuit, as shown in FIG. 10. Formed by R27, R28, R29, R30 and external water level probes, this circuit detects level changes through U4 (W-AD1, W-AD2) to determine the presence or absence of water, with the state displayed on the LCD.

Figure 11:
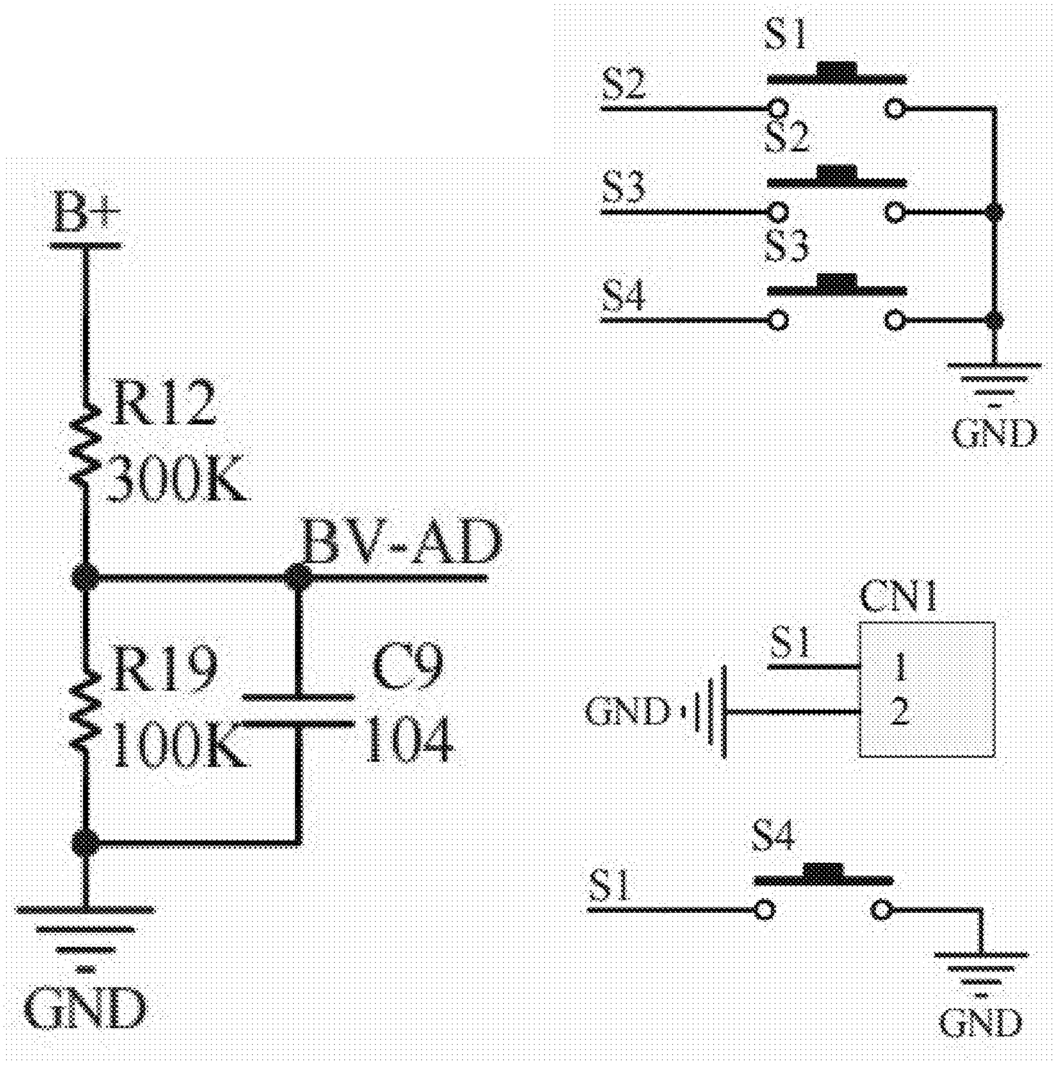
FIG. 11 is a schematic diagram of a key function circuit of the sunlight-adaptive intelligent irrigation system based on solar charging power detection according to the present disclosure.

Based on the above embodiment, in the embodiment of the present disclosure, the solution also includes a key function circuit, as shown in FIG. 11, which is the key function circuit. S1, S2, S3, S4, CN1 and U4 constitute the key function circuit, enabling corresponding product functions through each key, such as level adjustment (+/−), water level switch, buzzer switch, and one-touch irrigation.

Figure 12:
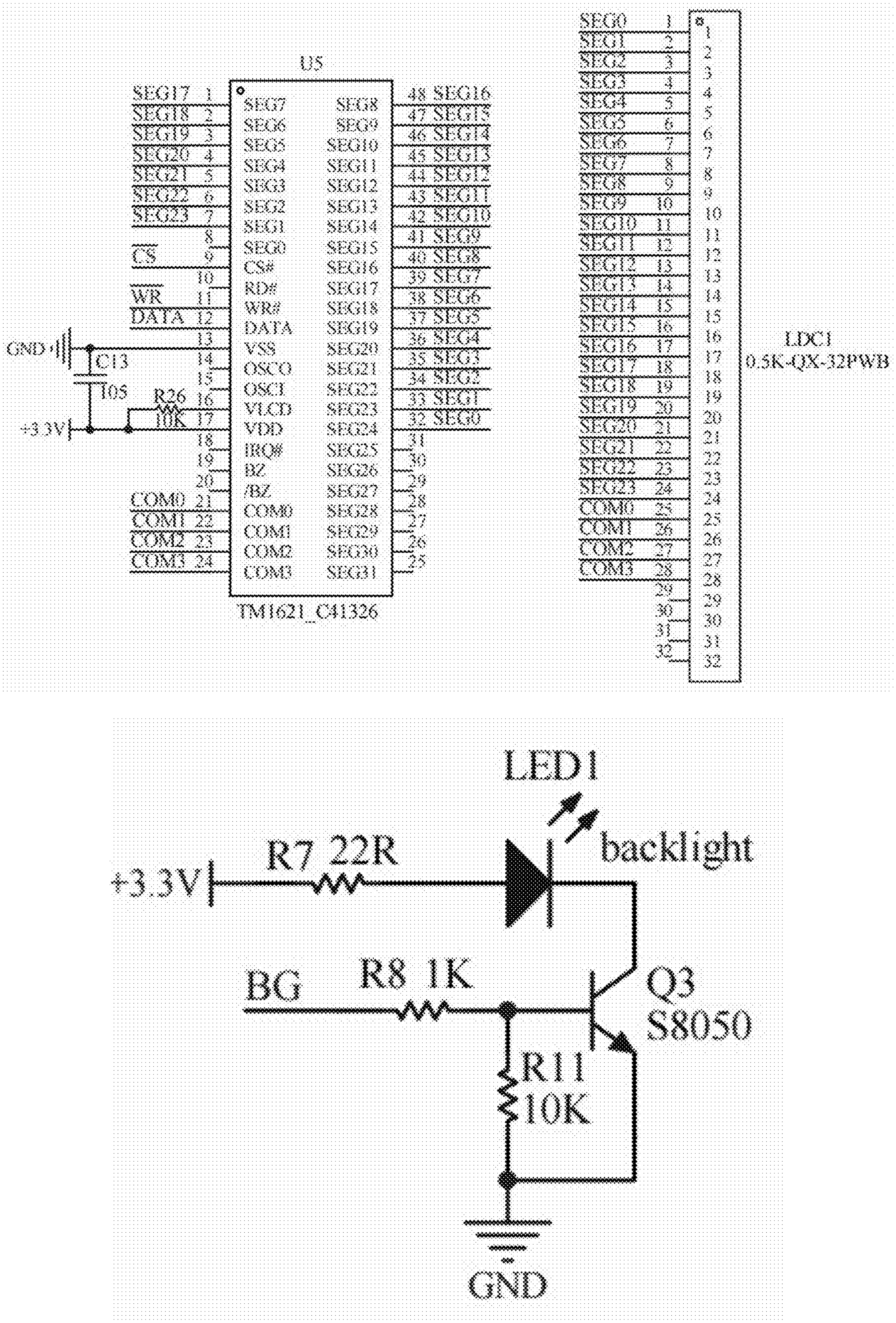
FIG. 12 is a schematic diagram of a LCD display control circuit and a backlight control circuit of the sunlight-adaptive intelligent irrigation system based on solar charging power detection according to the present disclosure.

Based on the above embodiment, in the embodiment of the present disclosure, the solution also includes an LCD display control circuit and a backlight control circuit, as shown in FIG. 12. The LCD display control circuit is composed of U4, U5 and LCD1 to achieve segment display on the LCD screen. The backlight control circuit is composed of R7, LED1, R8, R11, Q3 and U4 (BG).

To achieve the above inventive objective, the present disclosure further provides a sunlight-adaptive intelligent irrigation method based on solar charging power detection, as shown in FIG. 13. The method is applied to the sunlight-adaptive intelligent irrigation system based on solar charging power detection. The method includes the following steps:

- setting basic irrigation parameters of the system, wherein the basic irrigation parameters comprise an irrigation interval and a standard single irrigation duration based on standard sunlight conditions;
- periodically detecting electrical parameter of the solar panel and calculating sunlight intensity decision value data of a current environment based on the electrical parameter;
- comparing the sunlight intensity decision value data with preset sunlight intensity ranges and generating corresponding sunlight intensity grade data;
- proportionally adjusting and processing the standard single irrigation duration based on the sunlight intensity grade data to calculate and generate the corresponding actual irrigation duration; and
- when an irrigation time determined by the irrigation interval arrives, controlling an execution component to operate for the actual irrigation duration and perform irrigation in real time.

The electrical parameters include the charging voltage, charging current, or charging power of the solar panel.

The step of periodic detection involves: collecting instantaneous electrical parameters of the solar panel at a first predefined time interval and calculating the average of multiple instantaneous values within a second predefined time window, using the obtained average as the sunlight intensity decision value.

Specifically, in the embodiment of the present disclosure, the irrigation interval can be set in two ways: a) preset a fixed value in the program, such as irrigating once every 3 hours; b) allow users to set the irrigation interval themselves, such as selecting once every 3 hours or once every 12 hours through keys.

Setting single irrigation duration (standard value): users can set the irrigation duration based on the actual water needs of plants. The duration can be directly set, such as 1 minute, 2 minutes, 3 minutes, etc., or selected through preset levels, where level 1 corresponds to 1 minute, level 2 to 2 minutes, level 3 to 3 minutes, and so on. Note that these irrigation durations are system-preset standard values. For example, when sunlight intensity is 10,000-30,000 lux, the system determines it as "normal sunlight," and the corresponding irrigation durations are 1 minute, 2 minutes, 3 minutes, etc. When sunlight intensity is 2,000-10,000 lux, the system determines it as "weak sunlight," with corresponding durations of 0.5 minutes, 1 minute, 1.5 minutes, etc. When sunlight intensity exceeds 30,000 lux, the system determines it as "strong sunlight," with durations of 1.5 minutes, 3 minutes, 4.5 minutes, etc. The following serves as a special case for illustration. The values here are only for reference; actual applications may use other values.

TABLE 1

Reference Table for sunlight intensity and Irrigation Duration

| Solar panel charging voltage | Sunlight intensity | Determine sunlight conditions | Irrigation duration Level 1 | Level 2 | Level 3 | Level 4 | Level 5 | Level 6 | Level 7 | Level 8 | Level 9 | Level 10 | Irrigation interval |
|---|---|---|---|---|---|---|---|---|---|---|---|---|---|
| <0.7 V | <2000 lux | Night | No irrigation | | | | | | | | | | |
| 0.7-3.0 V | 2000-10000 lux | Weak sunlight | 0.5 | 1.0 | 1.5 | 2.0 | 3.0 | 4.0 | 6.0 | 8.0 | 10.0 | 12.0 | Fixed value 2 hours |
| 3.0-5.0 V | 10000-30000 lux | Normal sunlight | 1.0 | 2.0 | 3.0 | 4.0 | 6.0 | 8.0 | 10.0 | 12.0 | 14.0 | 16.0 | |
| >5.0 V | >30000 lux | Strong sunlight | 1.5 | 3.0 | 4.5 | 6.0 | 9.0 | 12.0 | 14.0 | 16.0 | 18.0 | 20.0 | |

The system determines sunlight intensity by utilizing the solar panel to assess the sunlight intensity value. Under varying sunlight conditions, the charging power of the solar panel differs. Therefore, the current sunlight intensity can be determined by detecting the solar panel's charging power (which may also involve measuring charging voltage or charging current). Taking a 6V/3 W solar panel as an example, when the sunlight intensity ranges between 2000-10000 lux, the charging voltage is 0.7-3.0V. This means that when the detected charging voltage of the solar panel is 0.7-3.0V, the system identifies it as "weak sunlight." For details, refer to Table 1 above.

It should be noted that to conserve power, the system periodically checks the solar panel's charging voltage at intervals (e.g., every 10 minutes) and then calculates an average (alternative methods like taking the maximum or median value may also be used) as the charging voltage for that period, thereby determining the sunlight intensity value. (This technical solution enables the determination of sunlight intensity by detecting the average charging voltage or current of the solar panel, which in turn determines the irrigation duration.)

Execute irrigation: when the scheduled time arrives, the system determines the irrigation duration based on the sunlight intensity value assessed in Step 3, then activates the water pump or opens the water valve to initiate irrigation.

Stop irrigation: when the irrigation duration ends, the system shuts off the water pump or closes the water valve, halting irrigation, and enters the next irrigation cycle.

It should be noted that the start time of each irrigation cycle can be calculated in two ways. However, neither timing method affects the principle of this patent.

a) The start time of the current irrigation cycle is the moment the previous cycle began irrigation. For example, if the irrigation interval is set to 3 hours and the irrigation duration to 10 minutes, with the first irrigation at 10:00, the second irrigation will occur at 13:00.

b) The start time of the current irrigation cycle is the moment the previous cycle stopped irrigation. For example, if the irrigation interval is set to 3 hours and the irrigation duration to 10 minutes, with the first irrigation at 10:00, the second irrigation will occur at 13:10.

To achieve the above inventive objective, the present disclosure further provides an automatic irrigator, including a housing, a control circuit housed within the housing, and a water pump or water valve connected to the control circuit. The control circuit includes the sunlight-adaptive intelligent irrigation system based on solar charging power detection.

To achieve the above inventive objective, the present disclosure further provides a computer-readable storage medium storing a computer program that, when executed by a processor, implements the sunlight-adaptive intelligent irrigation method based on solar charging power detection.

With the aid of the system of the present disclosure, which includes at least one main control unit for issuing intelligent irrigation control commands; a parameter setting module electrically connected to the main control unit for setting and inputting basic irrigation parameters; a solar detection module for detecting an electrical parameter of a solar panel and transmitting detection signals to the main control unit; and a drive execution module for controlling opening and closing of a water pump or a water valve according to the commands from the main control unit, the present disclosure can utilize the solar panel itself as a light sensor, indirectly and cost-effectively sensing environmental sunlight intensity by detecting its output electrical parameters, thereby achieving intelligent adaptive adjustment of irrigation volume based on weather changes. It addresses the issue of existing timed irrigation systems being unable to automatically adjust water volume according to sunlight conditions, achieving the goals of water conservation and efficient irrigation.

In other words, the present disclosure intelligently perceives environmental sunlight intensity by using the inherent output voltage of the solar panel as the detection target, through voltage division sampling and averaging processing, and automatically adjusts the single irrigation duration proportionally based on this. This significantly enhances the environmental adaptability and water-saving efficiency of the irrigation system without the need for additional dedicated light sensors, while ensuring system reliability and cost-effectiveness.

In other words, the solution of the present disclosure can automatically adjust the irrigation volume based on sunlight intensity, thereby better meeting plant growth needs and conserving water. It leverages the charging characteristics of the solar panel to determine sunlight intensity and thus determine the irrigation duration.

The above-described embodiments merely represent several implementations of the present disclosure, and their descriptions are relatively specific and detailed. However, they should not be construed as limiting the scope of the present disclosure. It should be noted that for those skilled in the art, various modifications and improvements can be made without departing from the inventive concept, all of which fall within the protection scope of the present disclosure. Therefore, the protection scope of the present disclosure shall be defined by the appended claims.

What is claimed is:

1. A sunlight-adaptive intelligent irrigation system based on solar charging power detection, comprising:

at least one main control unit configured to issue intelligent irrigation control commands;

a parameter setting module electrically connected to the main control unit and configured to set and input basic irrigation parameters;

a solar detection module configured to detect an electrical parameter of a solar panel and transmitting detection signals to the main control unit; and a drive execution module configured to control opening and closing of a water pump or a water valve according to the commands from the main control unit;

wherein the main control unit is further configured to:

periodically collect instantaneous electrical parameters of the solar panel at a preset time interval, perform an averaging operation on a plurality of instantaneous values collected within a preset time window to obtain an average value, use the obtained average value as a light intensity determination value, and adjust watering duration based on the light intensity determination value.

2. The sunlight-adaptive intelligent irrigation system based on solar charging power detection according to claim 1, wherein the main control unit is configured to receive and store the basic irrigation parameters; receive the detection signals from the solar detection module and calculate a sunlight intensity decision value and a sunlight intensity grade; compute an actual irrigation duration based on the sunlight intensity grade and a standard single irrigation duration; and send the control commands to the drive execution module according to an irrigation interval and the actual irrigation duration.

3. The sunlight-adaptive intelligent irrigation system based on solar charging power detection according to claim 1, wherein the solar detection module comprises a power supply management module that is respectively connected to the solar panel, a rechargeable battery, and various power consumption modules within the system and is configured to manage solar charging and battery charge/discharge protection and provide a stable operating voltage for the system.

4. An automatic irrigator, comprising a housing, a control circuit housed within the housing, and a water pump or a water valve connected to the control circuit, wherein the control circuit comprises the sunlight-adaptive intelligent irrigation system based on solar charging power detection according to claim 1.

5. The sunlight-adaptive intelligent irrigation system based on solar charging power detection according to claim 1, wherein the system further comprises a state monitoring module electrically connected to the main control unit and configured to monitor a real-time operating state of the system;

the state monitoring module comprises one or more of the following sub-modules:

a water pump current detection sub-module for detecting an operating current of the water pump to determine an idle, normal, or stall states of the water pump;

a water level detection sub-module for detecting a water source level to determine a water shortage state; and a battery voltage detection sub-module for detecting a rechargeable battery voltage to determine a battery level state.

6. The sunlight-adaptive intelligent irrigation system based on solar charging power detection according to claim 5, wherein the system further comprises a human-machine interaction module electrically connected to the main control unit;

the human-machine interaction module comprises one or more of the following units:

a display unit for displaying the basic irrigation parameters, the sunlight intensity grade, the actual irrigation duration, and the real-time operating state of the system;

an alarm unit for issuing an audio-visual alarm when the state monitoring module detects an abnormal state; and a key input unit for receiving operation inputs from a user.

7. The sunlight-adaptive intelligent irrigation system based on solar charging power detection according to claim 1, wherein the system further comprises a second control circuit for coordinatively issuing the intelligent irrigation control commands, wherein the second control circuit is a single-chip microcomputer control circuit.

8. The sunlight-adaptive intelligent irrigation system based on solar charging power detection according to claim 1, wherein the system further comprises a third control circuit that cooperates with the main control unit to determine a sunlight intensity value by detecting a charging voltage or an average current of the solar panel, thereby determining the irrigation duration, wherein the third control circuit is a solar sunlight intensity detection circuit.

9. The sunlight-adaptive intelligent irrigation system based on solar charging power detection according to claim 8, wherein the third control circuit is provided with an eighth MOS transistor;

a drain of the eighth MOS transistor is connected to one end of a thirty-fifth resistor and one end of a thirty-sixth resistor respectively; the other ends of the thirty-fifth resistor and the thirty-sixth resistor are both connected to a voltage terminal;

a gate of the eighth MOS transistor is connected to one end of a thirty-seventh resistor and one end of a thirty-eighth resistor respectively; the other end of the thirty-seventh resistor is electrically connected to the second control circuit;

a source of the eighth MOS transistor is connected to one end of a thirty-ninth resistor, one end of a fortieth resistor and one end of a forty-first resistor respectively;

the other end of the thirty-ninth resistor is electrically connected to one end of a fifteenth capacitor and the second control circuit respectively;

the other ends of the thirty-eighth resistor, the fortieth resistor, the forty-first resistor and the fifteenth capacitor are all grounded.

10. The sunlight-adaptive intelligent irrigation system based on solar charging power detection according to claim 9, wherein a model of the eighth MOS transistor is A03400.

11. A sunlight-adaptive intelligent irrigation method based on solar charging power detection, wherein the method is applied to the sunlight-adaptive intelligent irrigation system based on solar charging power detection according to claim 1; the method comprising:

setting basic irrigation parameters of the system, wherein the basic irrigation parameters comprise an irrigation interval and a standard single irrigation duration based on standard sunlight conditions;

periodically collecting instantaneous electrical parameters of the solar panel at a preset time interval, performing an averaging operation on a plurality of instantaneous values collected within a preset time window to obtain an average value, and using the obtained average value as light intensity determination data of a current environment;

comparing the light intensity determination data with preset sunlight intensity ranges and generating corresponding sunlight intensity grade data based on the comparison;

proportionally adjusting and processing the standard single irrigation duration based on the sunlight intensity grade data to calculate and generate corresponding actual irrigation duration; and when an irrigation time determined by the irrigation interval arrives, controlling an execution component to operate for the actual irrigation duration and perform irrigation in real time.

12. The sunlight-adaptive intelligent irrigation method based on solar charging power detection according to claim 11, wherein the electrical parameter is one of charging voltage, charging current or charging power of the solar panel.

13. A computer-readable storage medium storing a computer program, wherein the program, when executed by a processor, implements the sunlight-adaptive intelligent irrigation method based on solar charging power detection according to claim 11.

14. A sunlight-adaptive intelligent irrigation system based on solar charging power detection, comprising:

at least one main control unit configured to issue intelligent irrigation control commands;

a parameter setting module electrically connected to the main control unit and configured to set and input basic irrigation parameters;

a solar detection module configured to detect an electrical parameter of a solar panel and transmitting detection signals to the main control unit; and a drive execution module configured to control opening and closing of a water pump or a water valve according to the commands from the main control unit;

wherein the main control unit is configured to receive and store the basic irrigation parameters; receive the detection signals from the solar detection module and calculate a sunlight intensity decision value and a sunlight intensity grade; compute an actual irrigation duration based on the sunlight intensity grade and a standard single irrigation duration; and send the control commands to the drive execution module according to an irrigation interval and the actual irrigation duration;

wherein the solar detection module comprises a power supply management module that is respectively connected to the solar panel, a rechargeable battery, and various power consumption modules within the system and is configured to manage solar charging and battery charge/discharge protection and provide a stable operating voltage for the system;

wherein the power supply management module is provided with a first control circuit for controlling solar charging and battery charge/discharge protection and providing a stable operating voltage for the system;

the first control circuit is provided with a sixth MOS transistor; a drain of the sixth MOS transistor is connected to a thirty-first resistor, a second resistor, a first resistor and a solar panel input terminal respectively; and a gate of the sixth MOS transistor is connected to a collector of a seventh triode; a source of the sixth MOS transistor is connected to one end of a first capacitor and an anode of a first diode respectively.

15. A sunlight-adaptive intelligent irrigation system based on solar charging power detection, comprising:

at least one main control unit configured to issue intelligent irrigation control commands;

a parameter setting module electrically connected to the main control unit and configured to set and input basic irrigation parameters;

a solar detection module configured to detect an electrical parameter of a solar panel and transmitting detection signals to the main control unit; and a drive execution module configured to control opening and closing of a water pump or a water valve according to the commands from the main control unit;

wherein the system further comprises a second control circuit for coordinatively issuing the intelligent irrigation control commands, wherein the second control circuit is a single-chip microcomputer control circuit;

wherein the second control circuit is provided with a fourth control chip;

a twenty-first pin of the fourth control chip is connected to one end of a first crystal oscillator and one end of a twelfth capacitor respectively;

a twenty-second pin of the fourth control chip is connected to the other end of the first crystal oscillator and one end of the eleventh capacitor respectively; a fourteenth pin of the fourth control chip is connected to one end of a fourteenth capacitor and a power terminal respectively; and the other end of the twelfth capacitor, the other end of the fourteenth capacitor and the other end of the eleventh capacitor are all grounded.

16. The sunlight-adaptive intelligent irrigation system based on solar charging power detection according to claim 15, wherein a model of the fourth control chip is XY51F154.

* * * * *